United States Patent
Cheng et al.

(10) Patent No.: US 9,969,349 B2
(45) Date of Patent: May 15, 2018

(54) PASSENGER AIRBAG WITH EXTENDED BASE

(71) Applicant: FORD GLOBAL TECHNOLOGIES, LLC, Dearborn, MI (US)

(72) Inventors: James Chih Cheng, Troy, MI (US); Jaeho Cho, Shelby Township, MI (US); Jamel E. Belwafa, Ann Arbor, MI (US); Mohammed Omar Faruque, Ann Arbor, MI (US); Edward Joseph Abramoski, Canton, MI (US); Pardeep Kumar Jindal, Canton, MI (US); Diamal Eddine Midoun, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 435 days.

(21) Appl. No.: 14/260,601

(22) Filed: Apr. 24, 2014

(65) Prior Publication Data

US 2015/0307056 A1    Oct. 29, 2015

(51) Int. Cl.
*B60R 21/233* (2006.01)
*B60R 21/205* (2011.01)
(Continued)

(52) U.S. Cl.
CPC .......... *B60R 21/233* (2013.01); *B60R 21/205* (2013.01); *B60R 21/231* (2013.01);
(Continued)

(58) Field of Classification Search
CPC ........ B60R 21/233; B60R 2021/23308; B60R 2021/23324; B60R 21/205; B60R 2021/161
(Continued)

(56) References Cited

U.S. PATENT DOCUMENTS

| 4,262,931 A | 4/1981 | Strasser et al. |
| 5,022,675 A | 6/1991 | Zelenak, Jr. et al. |

(Continued)

FOREIGN PATENT DOCUMENTS

| CA | 2361732 A1 | 4/2003 |
| CN | 104943649 A | 9/2015 |

(Continued)

OTHER PUBLICATIONS

Non-Final Office Action dated Oct. 6, 2014 in U.S. Appl. No. 14/260,680, filed Apr. 24, 2014.
(Continued)

*Primary Examiner* — Karen Beck
(74) *Attorney, Agent, or Firm* — Frank MacKenzie; Brooks Kushman P.C.

(57) ABSTRACT

An airbag module for a vehicle includes an inflator disposed behind an instrument panel and an airbag arrangement. The airbag arrangement includes a cushion section configured to receive an occupant during impact and a balloon section disposed proximate a base of the cushion section and adjacent the instrument panel such that, upon inflation, the balloon section contacts and pushes against the instrument panel. This forms a swell on the cushion section adjacent to the balloon section configured to hinder movement of the occupant toward the balloon section.

10 Claims, 2 Drawing Sheets

(51) Int. Cl.
*B60R 21/231* (2011.01)
*B60R 21/16* (2006.01)
*B60R 21/2334* (2011.01)
*B60R 21/2338* (2011.01)
*B60R 21/235* (2006.01)

(52) U.S. Cl.
CPC ..... *B60R 21/2334* (2013.01); *B60R 2021/161* (2013.01); *B60R 2021/23308* (2013.01); *B60R 2021/23382* (2013.01); *B60R 2021/23504* (2013.01)

(58) Field of Classification Search
USPC .............................. 280/729, 732, 743.2, 735
See application file for complete search history.

(56) References Cited

U.S. PATENT DOCUMENTS

| | | | |
|---|---|---|---|
| 5,044,663 A | 9/1991 | Seizert | |
| 5,213,361 A | 5/1993 | Satoh et al. | |
| 5,380,038 A | 1/1995 | Hawthorn et al. | |
| 5,575,497 A * | 11/1996 | Suyama | B60R 21/231 280/730.1 |
| 6,254,130 B1 | 7/2001 | Jayaraman et al. | |
| 6,419,262 B1 | 7/2002 | Fendt et al. | |
| 6,499,765 B2 * | 12/2002 | Hawthorn | B60R 21/237 280/732 |
| 6,550,804 B2 | 4/2003 | Burdock | |
| 6,554,313 B2 | 4/2003 | Uchida | |
| 6,616,184 B2 | 9/2003 | Fischer | |
| 6,942,242 B2 * | 9/2005 | Hawthorn | B60R 21/16 280/728.2 |
| 6,962,363 B2 | 11/2005 | Wang | |
| 6,981,719 B2 | 1/2006 | Igawa | |
| 7,163,229 B2 | 1/2007 | Hasebe et al. | |
| 7,334,812 B2 | 2/2008 | Abe | |
| 7,377,548 B2 | 5/2008 | Bauer et al. | |
| 7,390,020 B2 * | 6/2008 | Hasebe | B60R 21/233 280/743.2 |
| 7,571,931 B2 | 8/2009 | Watanabe | |
| 7,631,891 B2 | 12/2009 | Washino | |
| 7,681,909 B2 | 3/2010 | Idomoto et al. | |
| 8,215,671 B2 | 7/2012 | Bergstrom et al. | |
| 8,408,593 B2 * | 4/2013 | Kuhlmann | 280/732 |
| 8,419,053 B2 | 4/2013 | Ahn | |
| 8,544,882 B2 | 10/2013 | Gulde et al. | |
| 8,876,153 B2 | 11/2014 | Dix | |
| 9,150,186 B1 | 10/2015 | Belwafa et al. | |
| 2003/0116945 A1 * | 6/2003 | Abe | 280/729 |
| 2005/0098994 A1 | 5/2005 | Matsumura | |
| 2005/0110257 A1 | 5/2005 | Cohen | |
| 2006/0103118 A1 | 5/2006 | Hasebe | |
| 2006/0163848 A1 * | 7/2006 | Abe | 280/729 |
| 2006/0186656 A1 | 8/2006 | Kumagai | |
| 2006/0197324 A1 | 9/2006 | Kinkenberger | |
| 2009/0121462 A1 | 5/2009 | Rick | |
| 2009/0179404 A1 | 7/2009 | Peyre et al. | |
| 2011/0101660 A1 * | 5/2011 | Schneider et al. | 280/731 |
| 2011/0140399 A1 * | 6/2011 | Kuhlmann | 280/730.2 |
| 2011/0175334 A1 | 7/2011 | Miller et al. | |
| 2013/0001934 A1 | 1/2013 | Nagasawa et al. | |
| 2013/0001936 A1 | 1/2013 | Nagasawa et al. | |
| 2013/0087995 A1 | 4/2013 | Lee et al. | |

FOREIGN PATENT DOCUMENTS

| | | |
|---|---|---|
| DE | 102004011369 A1 | 3/2004 |
| EP | 1439096 A1 | 7/2004 |
| GB | 2415665 A | 1/2006 |
| JP | 02303951 A | 12/1990 |
| JP | 03032956 A | 3/1991 |
| JP | 08324373 A | 12/1996 |
| JP | 2006088856 A | 6/2006 |
| JP | 2006256508 A | 9/2006 |
| JP | 2009214872 A | 9/2009 |
| JP | 5366591 B2 | 9/2010 |
| JP | 2010241241 A | 10/2010 |
| KR | 20120043551 | 5/2012 |

OTHER PUBLICATIONS

Final Office Action dated Mar. 2, 2015 in U.S. Appl. No. 14/260,680, filed Apr. 24, 2014.
Sherwood, Chris, "An Update on the IIHS Small Overlap Research Program", SAE International, 2012 Government/Industry Meeting, Jan. 25, 2012, Washington, DC, Insurance Institute for Highway Safety, Highway Loss Data Institute.

* cited by examiner

PASSENGER AIRBAG WITH EXTENDED BASE

TECHNICAL FIELD

The present application relates to passenger side airbags for vehicles.

BACKGROUND

Traditionally, airbags are deployed upon impact. Airbags fill with gas and cushion vehicle occupants as they are displaced within the vehicle. They are also designed to absorb energy generated by the displacement of the occupants.

SUMMARY

A vehicle airbag system includes an airbag module. The airbag module includes an airbag arrangement and an inflator. The airbag arrangement defines a primary bag configured to receive an occupant during impact and a satellite bag positioned on a side of the primary bag. The satellite bag is configured to cause the airbag arrangement to recoil in a direction generally opposite the side of the primary bag. The satellite bag causes the airbag arrangement to recoil in response to inflation of the airbag arrangement.

A vehicle includes an instrument panel and an airbag module. The airbag module includes an airbag and an inflator disposed behind the instrument panel. The airbag defines, when inflated, a cushion section and a balloon section. The cushion section is configured to receive an occupant. The balloon section is configured to, during inflation, press against the instrument panel to propel the airbag toward a center of the vehicle.

An airbag module for a vehicle includes an inflator disposed behind an instrument panel and an airbag arrangement. The airbag arrangement includes a cushion section configured to receive an occupant during impact and a balloon section disposed proximate a base of the cushion section and adjacent the instrument panel such that, upon inflation, the balloon section contacts and pushes against the instrument panel. This forms a swell on the cushion section adjacent to the balloon section configured to hinder movement of the occupant toward the balloon section.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Airbags aid in protecting vehicle occupants during an impact. Impacts may occur in many different ways. Forces from an impact with a vehicle displace an occupant's body. Different impacts displace vehicle occupants in different directions. The displacement of the occupant's body causes the occupant to move toward rigid regions of the interior of the vehicle. As the occupant moves toward the rigid region, the airbag acts as a cushion absorbing energy, generated by the force of the impact, from the occupant. For example, an oblique impact—an impact at an angle of approximately 15°—may cause a vehicle occupant, or more specifically a passenger, to have a forward rotational force moving toward the center of the vehicle interior.

Figure 1:
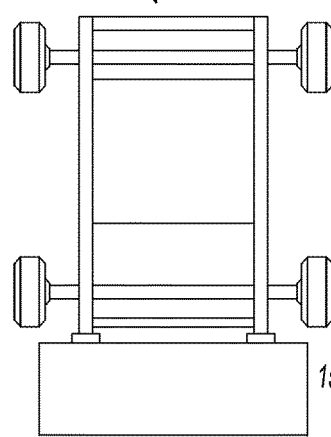
FIG. 1 is a top view of a vehicle about to experience an oblique impact.

Referring to FIG. 1, an oblique impact between vehicles is shown. Oblique impacts are impacts that occur at an angle, generally at approximately 15°. A first vehicle 10 is shown impacting a second vehicle 12. The impact between the first vehicle 10 and the second vehicle 12 generates a force displacing a vehicle occupant. During an oblique impact, the occupant is displaced and has a forward rotational force. In the case of a vehicle passenger, the forward rotational force moves the occupant toward the center of the instrument panel of the vehicle interior.

Figure 2:
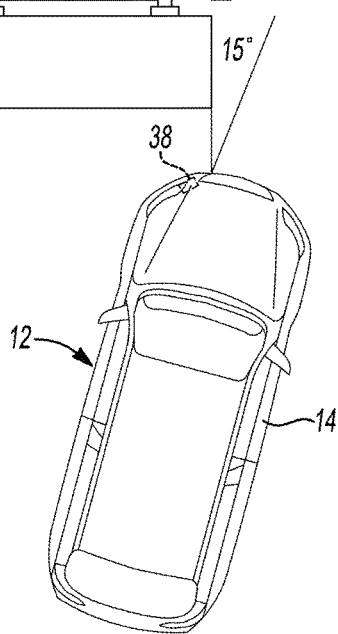
FIG. 2 is a front view of a deployed passenger side airbag.
Figure 2:
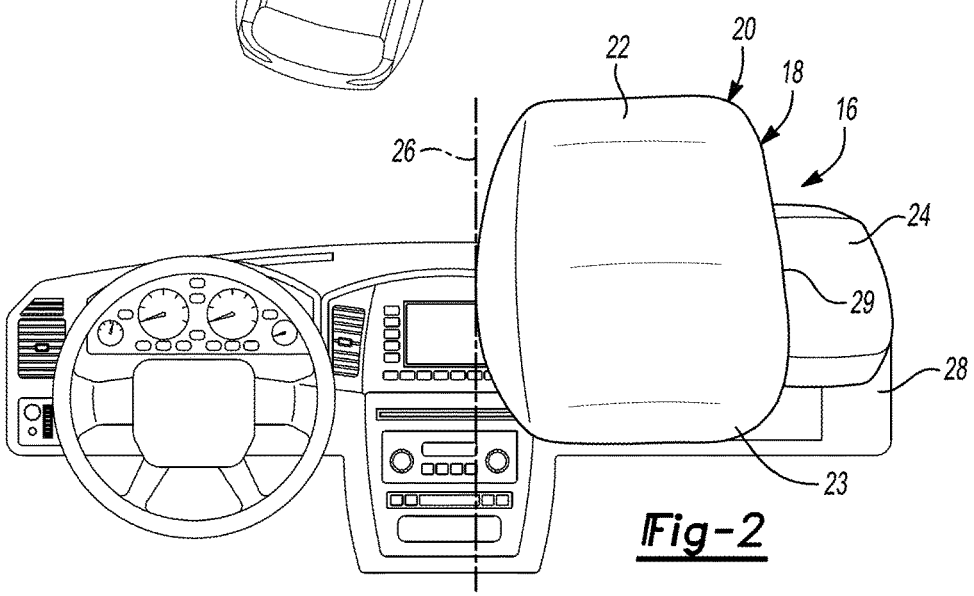

Referring to FIG. 2, an airbag system 16 is shown. The airbag system 16 includes an airbag module 18. The airbag module 18 further includes an airbag arrangement 20. The airbag arrangement 20 has a primary bag 22 and a satellite bag 24. The satellite bag 24 is disposed on a side 29 of the primary airbag 22. The primary bag 22 and the satellite bag 24 are arranged in a way such that the primary bag 22 is configured to receive an occupant and the satellite bag 24 is configured to cause the airbag arrangement 20 to recoil. In response to inflation, the satellite bag 24 balloons the primary airbag 22, rotating the primary airbag 22 away from the satellite bag 24.

In a preferred embodiment, the satellite bag 24 is disposed toward a base 23 of the primary airbag 22. However, the satellite bag 24 may be placed at various spots on the side 29 of the primary airbag 22. The size, shape, and location of the satellite bag 24 may be optimized in order to generate the recoil balloon force acting on the primary airbag 22.

The airbag arrangement 20 may be defined using a single chamber. Further, the satellite bag 24 may be approximately ⅓ of the volume defined by the primary bag 22. Other volume ratios, however, are also contemplated. Using a single chamber with the additional volume added by the satellite bag 24 allows the primary bag 22 to further cushion an occupant after impact. Despite an overall lower pressure, inflation of the airbag arrangement 20, more specifically the satellite bag 24, creates an eccentric moment about the primary bag 22. The primary bag 22, having a very small overall weight, requires minimal thrust in order to move. Therefore when the satellite bag 24 inflates, the reverse push of the inflation gas creates a resultant reaction in the middle of the airbag arrangement 20, pushing the primary bag 22 toward a center 26 of the vehicle.

The single chamber airbag arrangement 20 has various advantages. There is minimal change to the airbag arrangement 20 due to the small size of the satellite bag 24. This allows the airbag system 16 to maintain standard packaging and execution. Since the size of the satellite bag 24 does not drastically alter the overall size of the airbag arrangement 20, the packaging space in a vehicle instrument panel 28 does not need adaptation.

Figure 3:
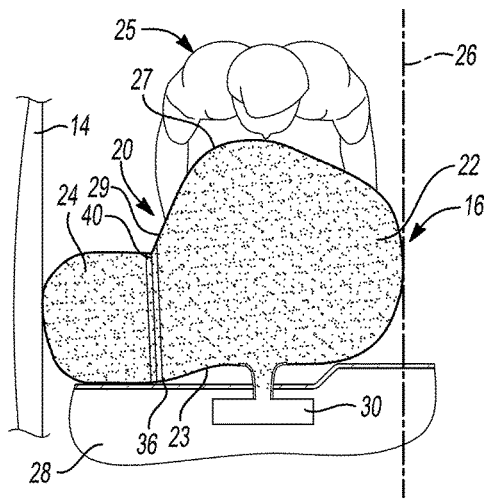
FIGS. 3 through 5 are top views of a vehicle occupant moving toward and into a deployed airbag arrangement during an oblique impact.
Figure 4:
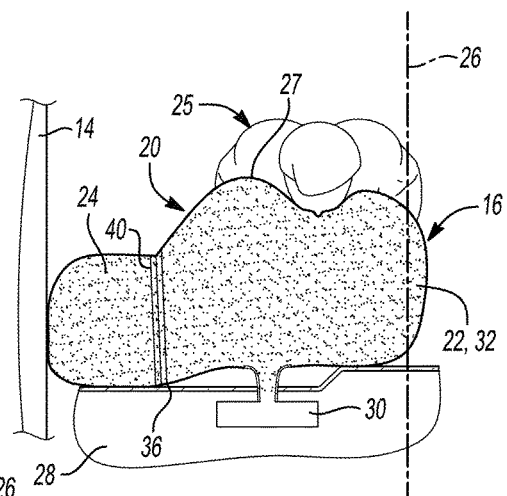
Figure 5:
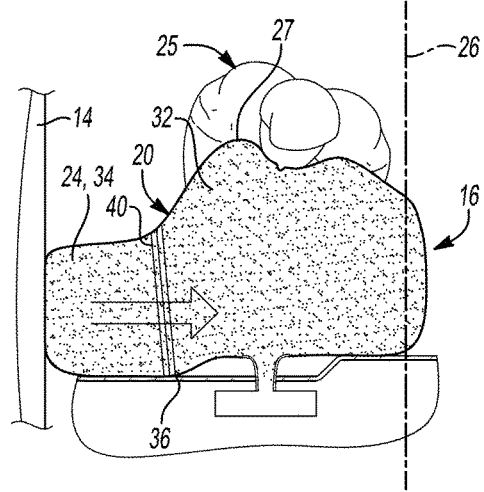

FIGS. 3, 4, and 5 depict a top view of the occupant's movement, after an oblique impact, toward the airbag system 16. Initially, upon impact, the occupant slides forward and contacts the primary bag 22. As the occupant's body begins to rotate and the airbag system 16 begins to inflate, the airbag arrangement 20 responds to the reverse push from the inflation of the satellite bag 24. The reverse push of the satellite bag 24 allows the primary airbag 22 to move toward the center 26 of the vehicle further cushioning the occupant and slowing the occupant's forward rotational force generated by the oblique impact.

Referring to FIG. 3, an occupant is shown sliding forward into the primary bag 22 after an oblique impact. As stated above, inflation of the airbag arrangement 20 causes the primary airbag 22 to move toward the center 26 of the vehicle. The satellite bag 24 is disposed near the base 23 of the primary airbag 22. After impact and upon inflation, the satellite bag 24 contacts the instrument panel 28. The satellite bag 24 uses the instrument panel 28 as a reactionary surface. The satellite bag 24, during inflation, will push against the instrument panel 28. Pushing against the instrument panel 28 further aids in generating the reactionary force needed to move the primary airbag 22 toward the center 26 of the vehicle.

The satellite bag pressure increases from inflation of the satellite bag 24. This will cause the push of the satellite bag 24 against the instrument panel 28. The rigid surface of the instrument panel 28 helps to generate a reaction force from the push against the satellite bag 24. The instrument panel 28, therefore, further aids the satellite airbag 24 in propelling the primary airbag 22 toward the center 26 of the vehicle. Also, the satellite bag 24 may contact the interior vehicle passenger door 14. The vehicle door 14 will also act as a reactionary surface creating a pushing force opposite the pushing force generated by the satellite bag 24 on the vehicle passenger door 14. This may further aid the propulsion of the primary bag 22 toward the center 26 of the vehicle.

Coupled with the reverse push of the inflation gas, these forces generate an eccentric moment on the primary airbag 22. This eccentric moment causes the primary airbag 22 to rotate towards the center 26 of the vehicle. This resultant reaction of the primary airbag 22 acts through the middle of the airbag arrangement 20. More specifically, the instrument panel 28 and passenger door 14, as reactionary surfaces, help keep the center volume of the primary bag 22 in line with the occupant's head as the occupant's head begins to rotate. This helps the airbag arrangement 20 to further ensure proper cushioning from the primary bag 22.

Because the instrument panel 28 is a rigid surface, the satellite airbag 24 may not move. The resultant reaction of the forces generated by the inflation of the satellite airbag 24 and the lack of movement of the satellite airbag 24 cause the airbag arrangement 20 to flex. The flex of the airbag arrangement 20 occurs proximate the side 29 of the primary airbag 22 on which the satellite airbag 24 is disposed. In the case of a passenger airbag system 16, the satellite airbag 24 is disposed proximate a passenger side 25 of the vehicle. This results in rotating the primary airbag 22 towards the center 26 of the vehicle.

Referring to FIG. 4, an occupant having forward rotational force is shown sliding into and contacting the primary airbag 22. The primary airbag 22 further includes a cushion section 32. As the occupant begins to slide into the primary airbag 22, the resultant reaction forces generated from the reverse inflation push of the satellite airbag 24 and the reactionary push from the instrument panel 28 and passenger door 14 on the satellite airbag 24 rotate the primary airbag 22. This causes the primary airbag 22 to be slanted as the occupant slides into the cushion section 32. The orientation of the primary airbag 22 is generally opposite the direction of the occupant's forward rotational force after an oblique impact.

The orientation of the primary airbag 22 further aids the airbag arrangement 20 to cushion an occupant. The forward rotational force generated on the occupant after an oblique impact causes the occupant to slide across the airbag arrangement 20. When the primary airbag 22 is slanted in a way generally opposite the way in which the forward rotational force causes the occupant to slide, the primary airbag 22 further impedes the movement of the occupant after impact. This allows the airbag arrangement 20 to provide more coverage to cushion the occupant. Further, the orientation of the primary airbag 22 further aids the cushion section 32 of the primary airbag 22 to catch the occupant after an impact.

The orientation of the primary airbag 22 provides a further resistance to an occupant's forward rotational force and allows the cushion section 32 to further receive the occupant within the airbag arrangement 20. When the primary airbag 22 begins to receive the occupant, the orientation of the primary airbag 22, being generally slanted opposite the direction of the occupant's movement, will sufficiently slow the occupant's forward rotational force and allow the cushion section 32 to catch and cushion the occupant. Further, because the primary airbag 22 is slanted due to the forces acting from the satellite bag 24, the airbag arrangement 20 provides further coverage of a vehicle interior. This may be advantageous during vehicle impacts.

Referring to FIG. 5, an occupant being caught and cushioned by the cushion section 32 of the airbag system 16 is shown. The cushion section 32 is configured to catch and cushion an occupant after an impact. The satellite bag 24 may also be referred to as a balloon section 34. The balloon section 34 is configured to move the cushion section 32. Acting as a balloon, the balloon section 34 is configured in a way such that inflation of the balloon section 34 pushes against the cushion section 32 of the airbag arrangement 20.

For example upon impact, the balloon section 34 may simultaneously inflate with the cushion section 32. Because the balloon section 34 has a smaller volume, the inflation gas fills the balloon section 34 before the cushion section 32 may be completely inflated. This forms a swell 27 on the cushion section and adjacent the balloon section 34. The swell 27 is configured to hinder movement of the occupant toward the vehicle center 26. Therefore, the balloon section 34 may not cushion the occupant.

The cushion section 32 cushions the occupant after an impact, and the balloon section 34 moves the cushion section 32 aiding the cushion section 32 in catching the occupant. The balloon section 34 may not contact the occupant. After impact, the occupant's forward rotational force slides the occupant towards the center 26 of the vehicle. This movement is generally opposite the direction in which the balloon section 34 is disposed. Therefore, the balloon section 34 has rigidity such that the balloon section 34 is configured to push the cushion section 32 and may not be configured to cushion an occupant.

The balloon section 34 may not receive or may not catch the occupant after an impact. The location and the size of the balloon section 34 may provide for minimal contact between the balloon section 34 and the occupant. Therefore, the balloon section 34 is configured to position the cushion section 32 such that the occupant may be caught by the cushion section 32. The balloon section 34 works in conjunction with the cushion section 32 to provide further support for the occupant after impact. This allows the cushion section 32 to further impede the movement of the occupant after impact and aids in further ensuring that the cushion section 32 cushions the occupant. The cushion section 32 may be the primary means for cushioning the occupant.

Due to the larger volume of the cushion section 32, there is less pressure within the cushion section 32. Further, the minimal volume of the balloon section 34 does not substantially alter the pressure needed to inflate the airbag arrangement 20. This allows the airbag arrangement 20 to use a traditional inflator 30 to inflate the airbag system 16. This may save time, cost, and manufacturing expenses. This, however, is merely one example of the airbag system 16. Various alternative designs may also achieve the desired result. For example, the airbag arrangement 20 may be formed with two or more chambers and use a plurality of inflators 30, or an adaptive inflator 30 configured to inflate the airbag arrangement 20 upon detection of an oblique impact.

The balloon section 34 may be formed from a different material than the cushion section 32. Further, the balloon section 34 may be formed by stitching, tethering, or by design. For example, the balloon section 34 may be formed by at least one tether. The tether 36 has an optimal length that varies based on the size of the airbag arrangement 20. Further, the at least one tether 36 may be an adaptive tether 36. For example, a collision sensor 38 may detect a full frontal impact. When a full frontal impact is detected, the adaptive tether 36 may not lengthen and therefore may not deploy the balloon section 34. Likewise, the collision sensor 38 may detect an oblique impact. When an oblique impact is detected, the adaptive tether 36 may lengthen and deploy the balloon section 34 in order to allow the airbag arrangement 20 to act as described above.

In a further embodiment, the balloon section 34 may be partitioned from the cushion section 32 by a panel 40. The panel 40 may act as a vent. Upon inflation of the cushion section 32, the panel 40 may vent the inflation gas from the cushion section 32 to the balloon section 34. Further, the panel 40 may be configured in a way such that the venting of the inflation gas is adaptive. The panel 40 may only vent gas to the balloon section 34 upon a detected oblique impact. For example if a collision sensor 38 detects a full frontal impact, the panel 40 will not vent inflation gas to the balloon section 34. Likewise if the collision sensor 38 detects an oblique impact, the panel 40 will allow the inflation gas to vent into the balloon section 34. This allows the airbag module 16 to be used in various vehicles of various sizes engaged in various types of collisions. This may save time, cost, and manufacturing expenses. The panel 40 may vent the inflation gas to the balloon section 34 using pyrotechnic, electrical, pneumatic, or mechanical designs.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an instrument panel; and
   an airbag module including a passenger side frontal airbag and an inflator disposed behind the instrument panel, the airbag defining, when inflated, a cushion section configured to receive an occupant torso during driver side oblique impacts and a balloon section configured to, during inflation, press against the instrument panel to propel the cushion section in a direction away from a passenger side to shift a position of the cushion section toward a driver side.

2. The vehicle of claim 1 wherein a volume defined by the balloon section is less than a volume defined by the cushion section.

3. The vehicle of claim 2 wherein the volume defined by the balloon section is approximately one third the volume defined by the cushion section.

4. The vehicle of claim 1 wherein the balloon section is positioned proximate the inflator.

5. The vehicle of claim 1 wherein the balloon section, when inflated, is positioned proximate a base of the cushion section.

6. An airbag module for a vehicle comprising:
   an inflator disposed behind an instrument panel; and
   a passenger side frontal airbag arrangement including a cushion section configured to receive an occupant torso during driver side oblique impacts and a balloon section disposed proximate a base of the cushion section and adjacent the instrument panel such that, upon inflation, the balloon section contacts and pushes against the instrument panel to propel the cushion section in a direction away from a passenger side to form a swell on the cushion section adjacent to the balloon section configured to hinder movement of the occupant toward a driver side.

7. The airbag module of claim 6 wherein the balloon section is partitioned from the cushion section via a panel configured such that upon an oblique impact by the vehicle, the panel vents inflation gas to the balloon section.

8. The airbag module of claim 6 wherein the balloon section is disposed proximate the inflator.

9. The airbag module of claim 6 wherein the cushion section is made of a material different than a material of the balloon section.

10. The airbag module of claim 6 further comprising a tether arranged to at least partially define the balloon section.

* * * * *